United States Patent [19]

Lacomis et al.

[11] Patent Number: 5,688,552
[45] Date of Patent: Nov. 18, 1997

[54] APPARATUS AND METHOD FOR PREPARING CYLINDERS IN OFFSET LITHOGRAPHIC PRINTING PRESSES

[75] Inventors: Joseph T. Lacomis, Pittston; Donald L. Welsch, Dunmore, both of Pa.

[73] Assignee: Panel Prints, Inc., Old Forge, Pa.

[21] Appl. No.: 577,365

[22] Filed: Dec. 22, 1995

[51] Int. Cl.$^6$ .............................. B32B 35/00; B05D 3/12
[52] U.S. Cl. .................... 427/140; 427/358; 427/386
[58] Field of Search ........................ 427/140, 142, 427/386, 358

[56] References Cited

U.S. PATENT DOCUMENTS

| | | | |
|---|---|---|---|
| 162,514 | 4/1875 | Allen . | |
| 188,765 | 3/1877 | Allen | 427/140 |
| 1,182,982 | 5/1916 | Crump . | |
| 2,254,298 | 9/1941 | Latham | 427/142 |
| 2,622,038 | 12/1952 | Charlesworth | 117/2 |
| 3,304,909 | 2/1967 | Hart et al. | 118/103 |
| 3,585,932 | 6/1971 | Granger | 101/169 |
| 3,656,999 | 4/1972 | Lundsager | 117/93.31 |
| 3,783,781 | 1/1974 | Grommek | 101/154 |
| 3,950,571 | 4/1976 | McBride et al. | 427/142 |
| 4,627,350 | 12/1986 | Sato et al. | 101/350 |
| 4,642,248 | 2/1987 | Howland | 427/224 |
| 4,702,946 | 10/1987 | Howland | 428/36 |
| 4,779,557 | 10/1988 | Frazzitta | 118/46 |
| 4,996,085 | 2/1991 | Sievers | 427/140 |
| 5,001,821 | 3/1991 | Herb | 29/121.2 |
| 5,167,755 | 12/1992 | Zodrow et al. | 118/261 |
| 5,168,806 | 12/1992 | Reder et al. | 118/261 |
| 5,180,612 | 1/1993 | Rendell | 118/261 |

FOREIGN PATENT DOCUMENTS

| | | |
|---|---|---|
| 491779 | 4/1953 | Canada . |
| 1219050 | 6/1966 | Germany . |

*Primary Examiner*—Diana Dudash
*Attorney, Agent, or Firm*—Seidel, Gonda, Lavorgna & Monaco, PC

[57] ABSTRACT

A method and apparatus for in-place repair of the outer surface of a cylinder in an offset lithographic printing press. The steps of the method are performed while the cylinder remains in the printing press. The steps are: cleaning the outer surface of the cylinder; applying an epoxy coating on the cylinder; drying the coating; inspecting the coating after drying to locate any high spots or low spots; and removing any high spots and filling any low spots. In the preferred embodiment, application of the epoxy coating is carried out with an applicator blade mounted on the printing press frame adjacent to the outer surface of the cylinder to be repaired. The applicator blade is an elongated member of substantially the same length as the cylinder and is adjustably mounted parallel to the axis of the cylinder at an adjustable distance from the outer surface of the cylinder, said distance being equal to the desired thickness of the epoxy coating to be applied to the outer surface of the cylinder. The applicator blade is mounted to brackets on the printing press using adjustable fasteners which allow for repositioning the applicator blade.

13 Claims, 4 Drawing Sheets

APPARATUS AND METHOD FOR PREPARING CYLINDERS IN OFFSET LITHOGRAPHIC PRINTING PRESSES

FIELD OF THE INVENTION

The invention pertains to a method and apparatus for repairing printing press cylinders, and more particularly, to a method and apparatus for repairing impression cylinders, plate cylinders, and/or blanket cylinders in offset lithographic presses.

BACKGROUND OF THE INVENTION

Five major processes are used in printing: letterpress, gravure, offset-lithography, flexography and screenprinting. Offset-lithography is the most popular of the processes. Offset lithographic presses are either "sheet-" or "web-" fed, the former being machines which print one sheet of paper at a time, as distinct from the latter which print on paper fed from a continuous roll or "web."

Sheet-fed lithographic presses use a rotary method of printing, incorporating three printing cylinders-plate, blanket, and impression. A lithographic printing plate is mounted or wrapped around the plate cylinder and clamped into place. During operation, the plate comes into contact with two sets of rollers-one for dampening, the other for inking. The dampening rollers apply a solution of water, gum arabic, and acid to the plate which prepares the image to accept the ink when it comes into contact with the ink roller. The ink is essentially repelled from the non-image areas, which are damp.

The plate then comes into contact with the blanket on the blanket cylinder which, being made of rubber, prevents the plate from being damaged through contact with an abrasive paper surface. Because the printing plate does not actually come into contact with the paper or other substrate, the process is widely known as "offset" lithography.

The cylinder which carries the paper into contact with the blanket cylinder is called the impression cylinder. From this cylinder, the paper picks up the printed impression.

The plate cylinders, blanket cylinders, and impression cylinders, are often damaged by foreign matter which enters the printing process. Occasionally, screws, bolts and other objects enter the paper path. In addition, chemicals used in the inking system cause the cylinders to deteriorate, as does normal wear and tear.

The damaged cylinders must be repaired in order to maintain quality printing. There are three methods of repair in the industry. Two of the methods allow for in-press repair, and the third method involves rebuilding of the cylinder out of the press.

If the area to be repaired is small and the cylinder has not collapsed, the cylinder can be repaired using automobile body putty, generically referred to as "bondo". Although this type of repair is quick and inexpensive, it is only temporary. These repairs can fail in minutes, weeks or months. Under heavy production conditions, such repairs typically last only 1 to 2 months. This method of repair is usually used when there is insufficient time to do a more permanent repair. If and when more time is available, the "bond-o" patch normally is removed and replaced with epoxy putty. Such epoxy patches typically last for 5 to 6 months. Another disadvantage with this method of repair is created by the edges where the patches meet the cylinder body. These edges cannot be feathered (smoothed) completely. Consequently, the edges of the patches can and often do show in the printed materials.

The second repair method uses "spot spray metallizing" to repair depressions on cylinders. Although this type of repair is more permanent than epoxy patching, it is significantly more expensive and the equipment being repaired is usually out of production for 3 to 4 days. Press down time and costs are dependent on the size of the depressions in the cylinders being repaired. This repair method has several disadvantages. First, it is relatively expensive. Second, the edges of the sprayed areas are extremely difficult to feather into the cylinder surfaces. In addition, large areas of cylinder depression cannot be repaired accurately, and the repaired surfaces cannot be ground to close tolerances. Finally, this method cannot be used on all types of presses, nor on all makes and models of cylinders. Although spot spray metallizing is often used to repair cylinders while the cylinders remain in the printing press, cylinders may also be removed and repaired off-site. This can provide a more permanent and better quality repair. However, off-site repairs mean substantial down time, since these types of repairs typically take 3 to 4 weeks to complete.

The third common method actually is not a repair, but a rebuilding of the cylinder. Depending on the make and model of the press and on which cylinder is damaged, one or two cylinders might have to be removed to gain access for removal of the damaged cylinder. After being removed, the damaged cylinder must be crated and shipped to a vendor for rebuilding. Turnaround time for cylinder rebuilding is usually 3 to 4 weeks.

It is desired to have a method of repairing cylinders which is significantly less expensive and results in repairs which are more permanent and of higher quality. In addition, it is desired to have a method of repair which eliminates the problems of hard edges showing in the printed sheets, and which can be used on all types of offset lithographic presses and cylinders.

SUMMARY OF THE INVENTION

The present invention is a method and apparatus for in-place repair of the outer surface of a cylinder in an offset lithographic printing press. The method of repair includes the application of a continuous epoxy coating of substantially uniform radial thickness circumferentially on the entire outer surface of the cylinder. After inspecting the dry coating, it may be necessary to finish the coating by removing any high spots and filling any low spots. In the preferred embodiment, application is carried out with an applicator blade.

The method in the preferred embodiment comprises the following steps. The first step is to clean the outer surface of the cylinder while the cylinder remains in the printing press. The next step is to mount the applicator blade on the printing press adjacent to the cylinder to be repaired while the cylinder remains in the printing press. The applicator blade preferably comprises an elongated member of substantially the same length as the cylinder. The blade is mounted so that it is parallel to the axis of the cylinder and is an adjustable distance from the outer surface of the cylinder. That distance is equal to the desired thickness of a coating of the epoxy to be applied to the cylinder surface.

The next step is to deposit epoxy along the length of the outer surface of the cylinder substantially parallel to the axis of the cylinder. This deposit of epoxy is preferably at a depth greater than the desired thickness of the epoxy coating. The cylinder is then rotated about its axis substantially one revolution from the location where the applicator blade contacts the deposit of epoxy. The epoxy coating is then allowed to dry. After the epoxy coating has dried, it is inspected and any high spots are removed by sanding or other means. The low spots, if any, are filled by applying additional epoxy.

In addition to the applicator blade, the apparatus of the present invention may include means for mounting the applicator blade on the printing press and means for adjusting the position of the applicator blade relative to the outer surface of the cylinder. In the preferred embodiment, the applicator blade is mounted to brackets which are in turn attached to the printing press frame. The brackets preferably include adjustable fasteners which allow for repositioning of the applicator blade.

In comparison with the prior art repair methods, the present invention significantly reduces the cost of repairs and the time of repairs, which substantially reduces press down time. This invention can be used to repair all types of printing cylinders on all sheet-fed offset lithographic presses and all hot-set and cold-set web-fed offset lithographic presses. The present invention may also be used on other types of printing presses.

The foregoing and other features and advantages of the present invention will become more apparent in light of the following detailed description of the preferred embodiments thereof, as illustrated in the accompanying figures.

BRIEF DESCRIPTION OF THE DRAWINGS

For a better understanding of the present invention, reference is made to the accompanying drawings. The drawings show one embodiment of the invention as presently preferred. However, it should be understood that the invention is not limited to the precise arrangements and instrumentalities shown in the drawings.

DETAILED DESCRIPTION OF THE INVENTION

Figure 1:
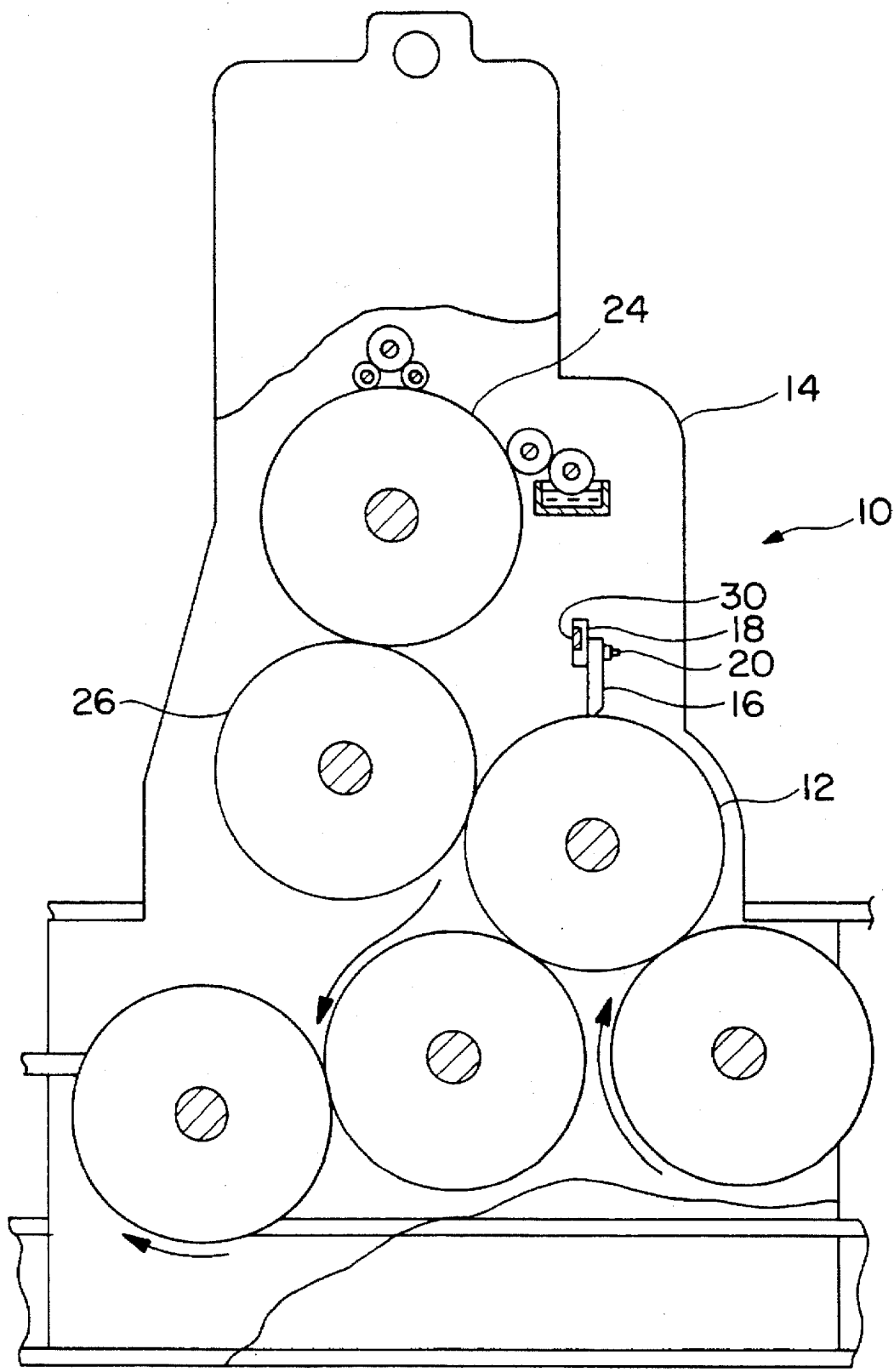
FIG. 1 is a partial cross-sectional view of a typical sheet-fed offset lithographic printing press illustrating one embodiment of the invention.
Figure 2:
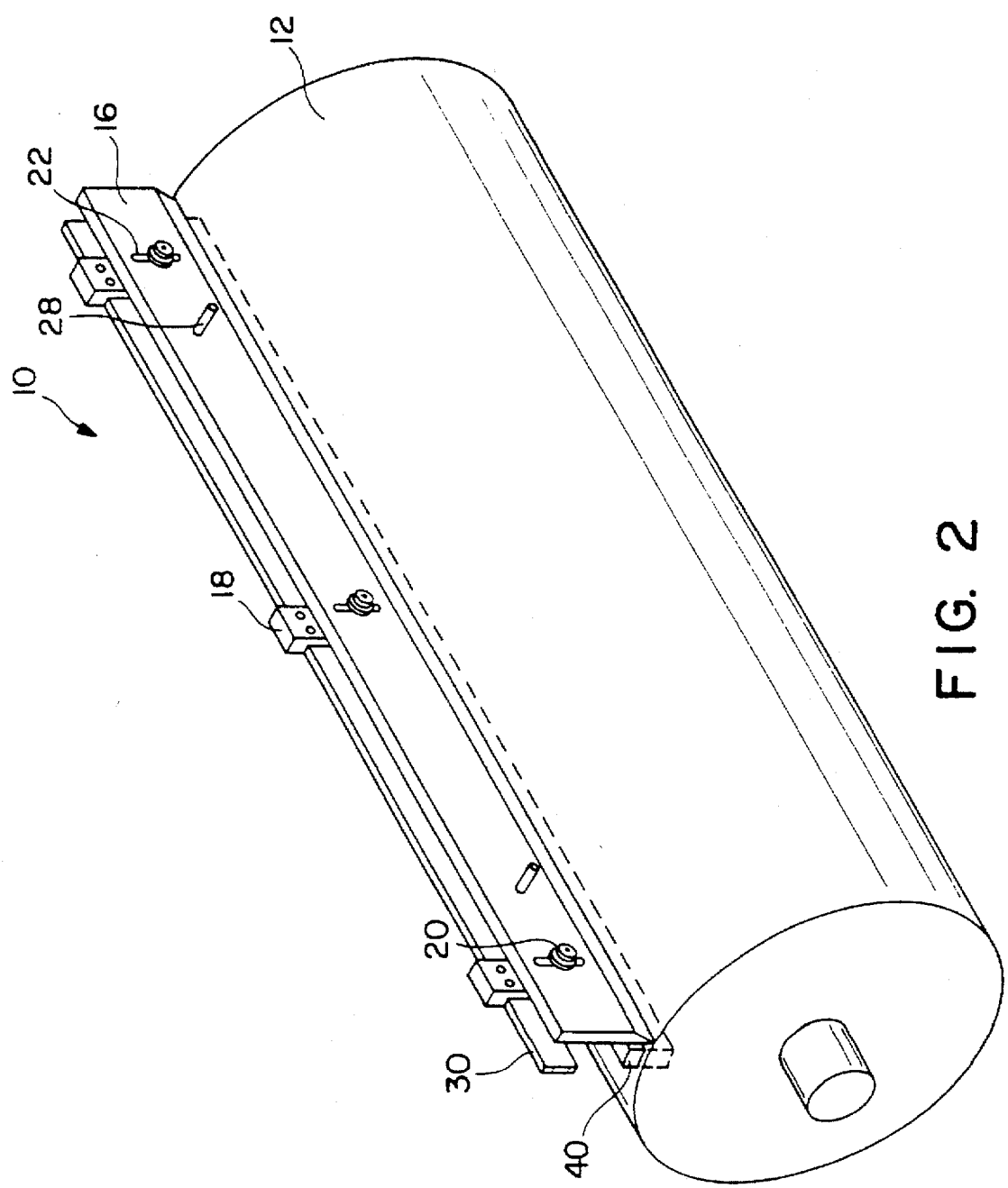
FIG. 2 is a perspective view illustrating one embodiment of the invention.
Figure 3:
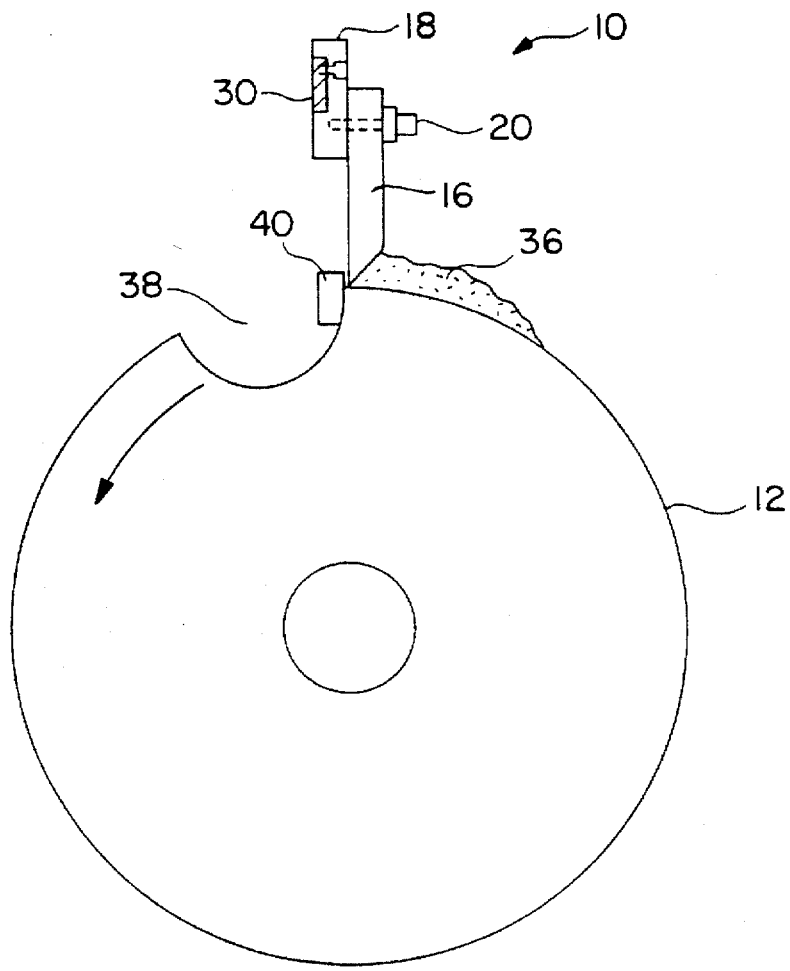
FIG. 3 is a side view showing the relative position of the applicator blade portion of the invention with the printing cylinder.

Referring to the drawings, where like elements are identified by like numerals, there is shown in FIGS. 1-3 a preferred embodiment of an on-press apparatus designated by numeral 10 for applying a continuous epoxy coating of substantially uniform radial thickness circumferentially on substantially the entire outer surface of a cylinder 12 in an offset lithographic printing press 14.

FIG. 1 illustrates the apparatus 10 in a sheet-fed offset lithographic printing press 14. The press uses a rotary method of printing and incorporates three printing cylinders: a plate cylinder 24, a blanket cylinder 26, and an impression cylinder 12. The cylinders located below the impression cylinder 12 are transfer cylinders, which assist during press operation with movement of the paper or other substrate as indicated by the arrows in FIG. 1.

The apparatus 10 used to repair the printing cylinders 12, 24, 26 is not on the printing press 14 while the press is running. The printing press 14 must be shut down when the apparatus 10 is mounted on the printing press 14. FIG. 1 illustrates the position of the apparatus 10 for repair of an impression cylinder 12. The plate cylinder 24 and the blanket cylinder 26 may be repaired in a similar manner. To repair each of those cylinders, the apparatus 10 is positioned above the cylinder to be repaired.

Referring to FIG. 2, an applicator blade 16 is attached by means of brackets 18 to a frame member 30 within the printing press 14. Adjustable fasteners 20 are provided for attaching the applicator blade 16 to the brackets 18. Apertures 22 in the applicator blade 16 receive the fasteners 20. The apertures 22 are slotted, which allow adjustment of the applicator blade 16 with respect to the cylinder 12. Handles 28 are used to manually reposition the applicator blade 16 relative to the surface of the cylinder 12.

Figure 4:
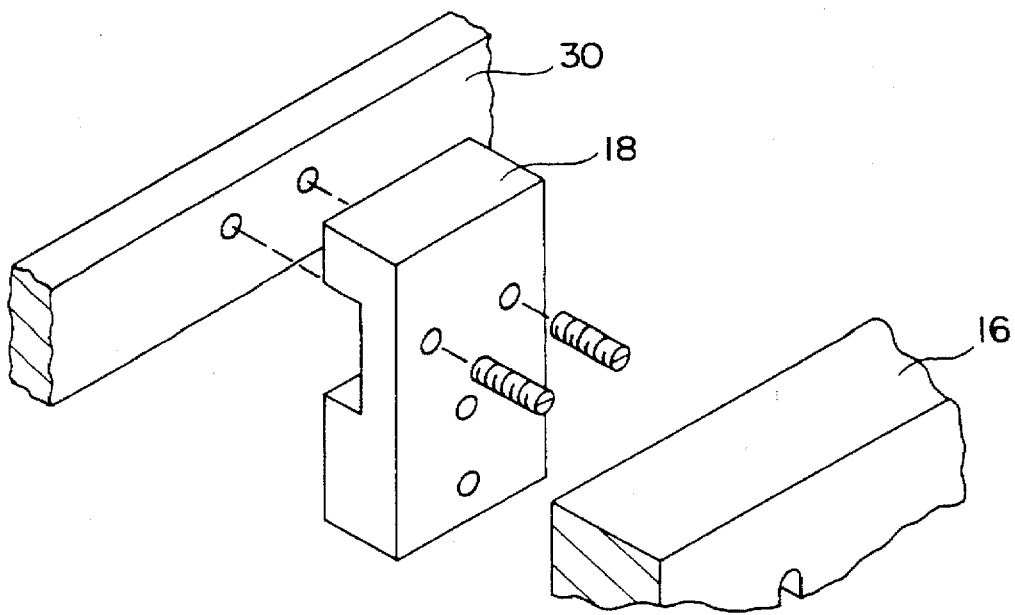
FIG. 4 is a perspective view of an embodiment of a bracket for use in the present invention.
Figure 5:
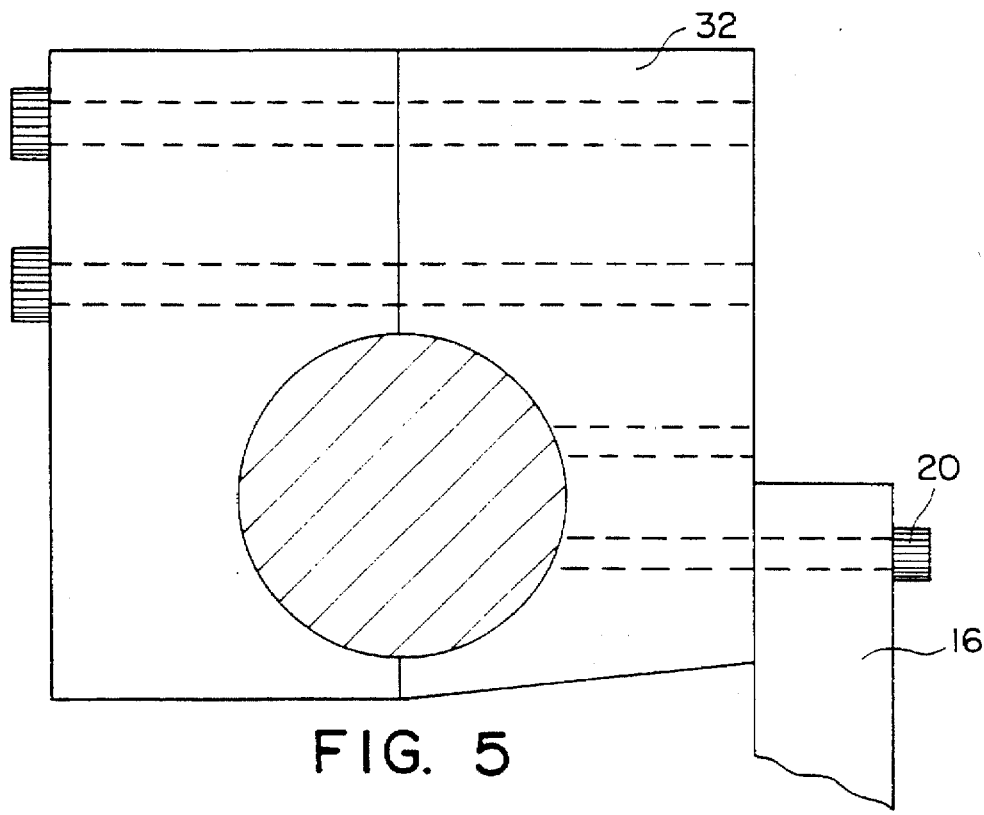
FIG. 5 is a cross-sectional view of an alternate bracket embodiment.
Figure 6:
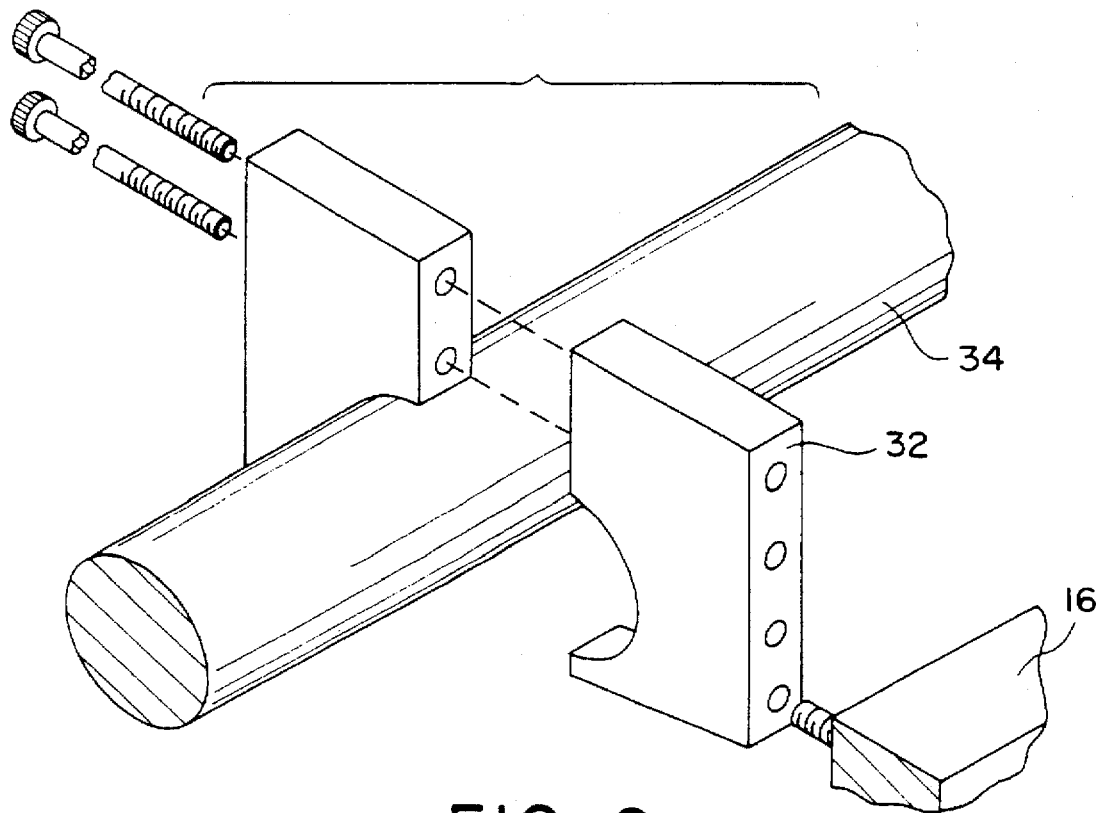
FIG. 6 is a perspective view of the bracket in FIG. 5.

In the embodiment shown in FIGS. 1-3, the brackets 18 attach to a skeleton wheel attachment bar 30 within the printing press 14. The skeleton wheel attachment bar 30 is typically located above an impression cylinder 12. FIG. 4 shows one embodiment of a bracket 18. The means for attaching the applicator blade 16 to the frame of the printing press 14 may vary with the type of cylinder being repaired and the type of press. For example, FIGS. 5 and 6 show an alternate bracket 32 which may be used to attach the applicator blade 16 to a sheet cleaner bar 34 within the press 14.

The applicator blade 16 in the preferred embodiment is a steel member of sufficient length to reach across the axial length of the cylinder 12, typically 4 to 5 feet. The blade 16 is about 0.50 to 0.625 inches thick with the straight edge nearest the cylinder 12 tapered at approximately 60° to a thickness of about 0.0625 inches. (Accuracy of the grind is ±0.0005 inches.) Those skilled in the art will recognize that the applicator blade 16 and the means for mounting and adjusting the position of the blade 16 may take many forms other than that shown in the preferred embodiment.

The steps of the repair method and the tools used for repair of the impression cylinder 12, plate cylinder 24, and blanket cylinder 26 are discussed below.

In addition to epoxy and the applicator blade, cleaning agents and sanding materials are used in the repair method. A de-greasing agent, an ink removing agent, and a final cleaning agent are used to clean the cylinders 12, 24, 26 of all foreign matter, including dirt, ink, gum arabic, grease, oil, rust, etc. Abrasive media and materials also are used during pre-application preparation of the cylinders 12, 24, 26. In addition to a rubber hand sanding pad, medium grit, fine grit, and finishing abrasive media are used for this purpose. An electric or pneumatic sander with a pad which fits the cylinders 12, 24, 26 may also be used during pre-application preparation.

To prepare the plate cylinder 24, the existing plate and packing are removed and discarded. The cylinder 24 is cleaned of all foreign matter using cleaning agents and sanding materials. The cylinder undercut and bearer height are determined using a packing gauge. Proper packing for the cylinder 24 is calculated based on the cylinder undercut and bearer height determined with the packing gauge. The new plate and packing are then installed on the cylinder 24.

To prepare the blanket cylinder 26, the existing blanket and blanket packing are removed and the packing is discarded. The cylinder 26 is cleaned of all foreign matter using cleaning agents and sanding materials. The undercut and bearer height are determined using a packing gauge. The proper packing for cylinder 26 is calculated based on the cylinder undercut and bearer height determined using a packing gauge. The new blanket and new packing are measured and installed on the cylinder 26.

The impression cylinder 12 is prepared by removing all foreign matter from the cylinder 12, bearers and surrounding area. The cylinder 12 is cleaned using cleaning agents and sanding materials.

The next step is to parallel all cylinders 12, 24, 26 in the printing press 14. With the press on impression, the feeler gauges are used to set the cylinders parallel using the press manufacturer's recommended techniques. To determine if the cylinders are parallel, dry solids can be pulled with the impression cylinder pressure backed off.

It is important to make sure that all cylinders 12, 24, 26 are in parallel to determine which cylinder or cylinders are damaged. This determination is made by pulling dry solids after paralleling is completed. A dark color ink is used so that variances in the tonal quality caused by pressure are easily seen. Pulling dry solids is done with the impression cylinder pressure backed off. After every increase in impression cylinder pressure, sheets are pulled and marked with the impression cylinder pressure and the areas where the cylinder is showing damage.

After determining which cylinder or cylinders are damaged, the remaining steps of the repair method are performed to repair the damaged cylinder or cylinders. The steps are discussed below for repair of an impression cylinder 12.

The speed of the press should be set as slow as the press will go on "crawl" and still maintain smooth operation. The speed should not exceed about 4 RPM. If the speed exceeds the recommended allowable RPM, the speed control should be adjusted to assure compliance.

The impression cylinder 12 is inspected for obvious blemishes and gouges. Any blemishes may be removed with a sanding block. Any gouges are filled with epoxy and precured.

Using the appropriate brackets 18, the applicator blade 16 is mounted on frame 30 within the press 14 so that the blade 16 rests against cylinder 12. No pressure should be applied to blade 16.

The press is then rolled two to three revolutions in slow motion on slow crawl speed. The blade should be observed for vibration or binding, and cylinder 12 should be inspected for polished high spot marks from rubbing against applicator blade 16. Any high spots should be polished off using a sanding block or fine abrasive material. This procedure should be repeated until there are no observable vibrations of the blade when the cylinder is rotated.

The clearance of the blade 16 over the cylinder bearers is measured with a feeler gauge. Two dial indicators are mounted on the applicator blade 16—one on the drive side and one on the operator side. The "zero" point on both bearers is marked, and the concentricity of the cylinder bearers is measured. Cylinder bearers should not be out of round by more "0.005".

The cylinder 12 is then roughed with fine grit paper and cleaned with alcohol. Multiple cleanings with alcohol are recommended. Clearance of the blade 16 over the bearers should be checked. The press is then rotated two to three revolutions to check again for vibration or binding of blade 16. Cylinder 12 is inspected again for polished high spot marks from rubbing against applicator blade 16, and any high spots are sanded down using a sanding block with fine abrasive sanding media. Multiple cleanings of cylinder 12 with alcohol are repeated and the clearance of blade 16 over the bearers is rechecked. This procedure is repeated until there is no vibration or scuffing.

When all necessary adjustments have been made, the epoxy is mixed and prepared for application. It is necessary to estimate the quantity of epoxy needed to coat the total area of the cylinder 12 at the desired thickness. Using a putty knife or similar tool, a strip of epoxy 36 is deposited in the "V" formed by the applicator blade 16 and the outside surface of cylinder 12. The cylinder 12 is then rotated about its axis substantially one revolution. The press is then shut down to allow the epoxy to dry.

After the epoxy has dried, cylinder 12 is dialed. If it is within specification, the repair is complete. Any high spots are sanded with #240 wet/dry. If there are any low spots, the area is roughed with fine sand paper and epoxy is applied to fill the low spots. If there are many low spots, applicator blade 16 may be used to apply the epoxy. If there are only a few low spots, the epoxy may be applied by hand. After drying, these spots of epoxy are smoothed in with fine abrasive media.

A common set of steps is included in the method of repair for each of the three types of printing cylinders 12, 24, 26. These common steps are discussed below for the repair of an impression cylinder 12. As indicated, the method of repair for the impression cylinder 12 is substantially the same for a plate cylinder 24 and a blanket cylinder 26.

The initial step is to clean the cylinder 12 of all foreign matter, such as dirt, ink, gum arabic, grease, oil, rust, etc. The next step is to mount the applicator blade 16 on a frame member 30 within the press 14, using the appropriate brackets 18, adjacent to the cylinder 12. The applicator blade 16 is mounted parallel to the axis of the cylinder 12 at an adjustable distance from the outer surface of the cylinder 12. After mounting, the position of the applicator blade 16 is adjusted relative to the outer surface of the cylinder 12, and set to the desired thickness of the coating of epoxy to be applied. In the preferred embodiment, this adjustment is facilitated by the slots 22 on the applicator blade 16.

When all necessary adjustments have been made, the epoxy is mixed and prepared for application. A suitable epoxy is that known as LPS® "Strong Steel" manufactured by LPS Laboratories, Inc., Tucker, Ga. It is necessary to estimate the quantity of epoxy needed to coat the total area of the cylinder 12 at the desired thickness. Typically, about four (4) kits of the LPS® epoxy are used; each kit contains about 5 ounces-2½ oz. of base and 2½ oz. of activator.

Using a putty knife or similar tool, a strip of epoxy 36 is deposited in the "V" formed by the applicator blade 16 and the outside surface of cylinder 12. The deposit extends along the entire length of the cylinder 12 at a depth greater than the desired thickness of the epoxy coating to be applied thereto. The cylinder 12 is then rotated about its axis substantially one revolution. Rotation should be at a speed as slow as the press will go on "crawl" and still maintain smooth operation. The speed should not exceed about 4 RPM.

Generally, the rotation of the cylinder will be less than 360° (but greater than 270°), since the outer surface of each of the cylinders 12, 24, 26 includes means to engage each sheet to be printed. A depressed area or gap 38 with protruding equipment 40 makes the outer surface of the cylinder discontinuous, as shown in FIG. 3. For example, an impression cylinder 12 is equipped with grippers 40 in the form of metal fingers that clamp on paper and control its movement as it passes through the printing press. A blanket cylinder 26 is equipped with blanket bar clamps for attaching the blanket, a rubber-surfaced fabric that is clamped around the blanket cylinder 26 and receives the image from the plate and transfers it to the paper or other substrate. A plate cylinder 24 is equipped with plate-clamping devices which hold the lithographic printing plate on the cylinder 24.

In the preferred embodiment, referring to an impression cylinder 12, the applicator blade 16 is set in front of the grippers 40. The cylinder 12 then is rotated counterclockwise and the outer surface becomes coated with a uniform coating of epoxy. The rotation is stopped when the gap 38 arrives at the applicator blade 16.

After the cylinder 12 has been rotated, the press 14 is shut down to allow the epoxy to dry. The epoxy used in the preferred embodiment has a set-up time of approximately 2–4 hours, and a drying time of about 16 hours to final strength.

After the epoxy has dried, the coating is inspected to locate any high spots or low spots on the outer surface. The high spots, if any, are removed by sanding. The low spots, if any, are filled with additional epoxy applied by hand.

The present invention may be embodied in other variant forms where the variation does not substantially differentiate from the essential novelty and uniqueness revealed in the foregoing disclosure. Reference should therefore be made to the appended claims rather than the foregoing specification, as indicating the scope of the invention. It should be understood that many modifications, variations and changes may be made without departing from the spirit and scope of the invention as defined in the claims.

What is claimed is:

1. A method for in-place repair of the outer surface of a cylinder in a printing press, comprising the steps of:
   cleaning the outer surface of the cylinder while the cylinder remains in the printing press;
   applying a continuous epoxy coating on the entire outer surface of the cylinder with a single applicator blade while the cylinder remains in the printing press; and
   drying said epoxy coating while the cylinder remains in the printing press.

2. The method as in claim 1, further comprising the steps of:
   inspecting the epoxy coating after drying to locate any high spots and low spots;
   removing any high spots on the outer surface of the epoxy coating; and
   filling any low spots on the outer surface of the epoxy coating.

3. The method as in claim 1, further comprising the step of mounting the applicator blade on the printing press adjacent to the outer surface of the cylinder to be repaired.

4. The method as in claim 3, wherein said applicator blade is an elongated member of substantially the same length as the cylinder and is adjustably mounted parallel to the axis of said cylinder.

5. The method as in claim 3, further comprising the steps of:
   adjusting the distance between the applicator blade and the outer surface of the cylinder; and
   setting the distance equal to the thickness of the epoxy coating needed to repair the damage on the outer surface of the cylinder so that the repaired cylinder has a substantially uniform outer surface.

6. A method for in-place repair of the outer surface of a cylinder in a printing press, comprising the steps of:

cleaning the outer surface of the cylinder while the cylinder remains in the printing press;

mounting an applicator blade on the printing press adjacent to the outer surface of the cylinder to be repaired;

adjusting the distance between the applicator blade and the outer surface of the cylinder equal to the thickness of the epoxy coating needed to repair the damage on the outer surface of the cylinder so that the repaired cylinder has a substantially uniform outer surface;

while the cylinder remains in the printing press depositing epoxy over the length of the outer surface of the cylinder substantially parallel to the axis of the cylinder, said deposit of epoxy being of a quantity at least sufficient to coat the entire outer surface of the cylinder at a depth greater than the thickness of an epoxy coating needed to repair the damage on the outer surface of the cylinder so that the repaired cylinder has a uniform outer surface; and rotating the cylinder about its axis substantially one revolution from the location where said applicator blade contacts said deposit of epoxy.

7. A method for in-place repair of the outer surface of a cylinder in a printing press, comprising the steps of:

cleaning the outer surface of the cylinder while the cylinder remains in the printing press;

mounting an applicator blade on the printing press adjacent and parallel to the cylinder to be repaired;

adjusting the position of said applicator blade relative to the outer surface of the cylinder, said position leaving a distance between the cylinder and the applicator blade substantially equal to the thickness of a coating of epoxy needed to repair the damage on the outer surface of the cylinder so that the repaired cylinder has a substantially uniform outer surface;

depositing epoxy over the length of the outer surface of the cylinder substantially parallel to the axis of the cylinder, said deposit of epoxy being of a quantity at least sufficient to coat the entire outer surface of the cylinder at a depth greater than the thickness of the epoxy coating needed to repair all damage on the outer surface of the cylinder so that the repaired cylinder has a substantially uniform outer surface;

rotating the cylinder in the press about its axis approximately one revolution from the location where said applicator blade contacts said deposit of epoxy;

drying the epoxy coating while the cylinder remains in the printing press;

inspecting the epoxy coating after drying; and eliminating any high spots and low spots in the dried epoxy coating on the cylinder.

8. A method for in-place repair of the outer surface of a cylinder in a printing press, comprising the steps of:

cleaning the outer surface of the cylinder while the cylinder remains in the printing press;

applying a continuous epoxy coating of substantially uniform thickness on the entire outer surface of the cylinder with a single applicator blade while the cylinder remains in the printing press; and drying said epoxy coating while the cylinder remains in the printing press.

9. The method as in claim 8, further comprising the steps of:

inspecting the epoxy coating after drying to locate any high spots and low spots;

removing any high spots on the outer surface of the epoxy coating; and ruling any low spots on the outer surface of the epoxy coating.

10. The method as in claim 8, further comprising the step of mounting the applicator blade on the printing press adjacent to the outer surface of the cylinder to be repaired.

11. The method as in claim 8, further comprising the steps of:

adjusting the distance between the applicator blade and the outer surface of the cylinder; and setting the distance equal to the thickness of the epoxy coating needed to repair the damage on the outer surface of the cylinder so that the repaired cylinder has a substantially uniform outer surface.

12. A method for in-place repair of the outer surface of a cylinder in a printing press, comprising the steps of:

cleaning the outer surface of the cylinder while the cylinder remains in the printing press;

mounting an applicator blade on the printing press adjacent to the outer surface of the cylinder to be repaired;

adjusting the distance between the applicator blade and the outer surface of the cylinder equal to the thickness of the epoxy coating needed to repair the damage on the outer surface of the cylinder so that the repaired cylinder has a substantially uniform outer surface;

while the cylinder remains in the printing press, depositing a deposit of epoxy over the length of the outer surface of the cylinder substantially parallel to the axis of the cylinder, the quantity of epoxy being at least sufficient to coat the entire outer surface of the cylinder at a depth needed to repair the damage on the outer surface of the cylinder; and rotating the cylinder about its axis substantially only one revolution from the location where said applicator blade contacts said deposit of epoxy.

13. The method as in claim 12, further comprising the steps drying the epoxy coating while the cylinder remains in the printing press;

inspecting the epoxy coating after drying; and eliminating any high spots and low spots in the dried epoxy coating on the cylinder.

* * * * *